United States Patent [19]

Wadell

[11] Patent Number: 4,506,933

[45] Date of Patent: Mar. 26, 1985

[54] VEHICLE TRACK HAVING FLEXIBLE INTERCONNECTED LINKS

[75] Inventor: Georg Wadell, Valdemarsvik, Sweden

[73] Assignee: Gislaved Aktiebolag, Sweden

[21] Appl. No.: 493,346

[22] Filed: May 10, 1983

[30] Foreign Application Priority Data

May 12, 1982 [SE] Sweden .................................. 8202975

[51] Int. Cl.³ .............................................. B62D 55/20
[52] U.S. Cl. .................................... 305/35 R; 305/36;
152/221; 152/225 R; 198/851
[58] Field of Search .......................... 198/851; 474/271;
305/35 R, 35 EB, 40, 56, 19; 152/221, 222, 223, 224, 225 R

[56] References Cited

U.S. PATENT DOCUMENTS

| 1,515,592 | 11/1924 | Davies ................................... 152/223 |
| 1,968,811 | 8/1934 | Dobbs ................................... 152/221 |
| 2,498,523 | 2/1950 | Bergen ................................... 152/222 |
| 3,223,462 | 12/1965 | Dalrymple ......................... 305/40 X |
| 4,438,982 | 3/1984 | Pettersen ......................... 305/35 EB |

Primary Examiner—David A. Scherbel
Attorney, Agent, or Firm—Frishauf, Holtz, Goodman & Woodward

[57] ABSTRACT

A track for wheeled vehicles comprises a plurality of flexible track links connected together. The track links have cylindrical holes at the edges of the track links, which holes extend in the longitudinal direction of the track. Cylindrical fastening units are rotatably arranged in the holes and are connected between the track links by fastening devices so that the cylindrical fastening units can turn in relation to each other around shafts parallel to the axles of the vehicle wheels.

20 Claims, 6 Drawing Figures

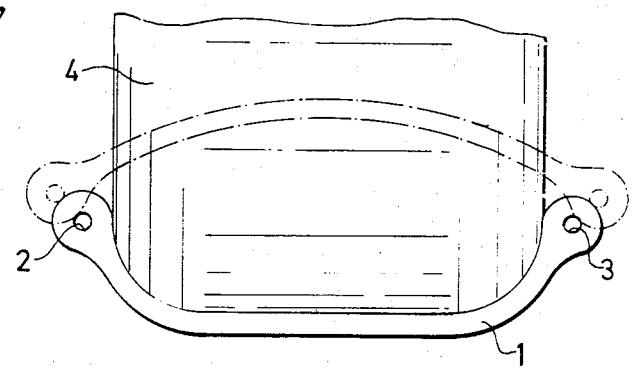
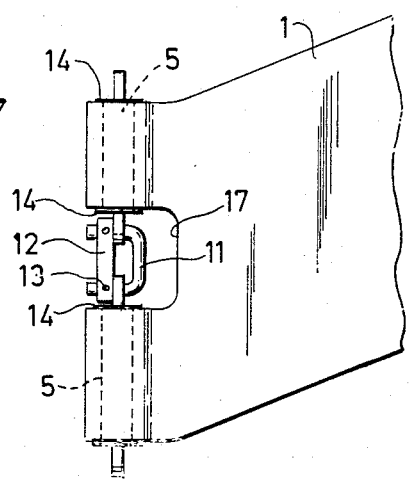
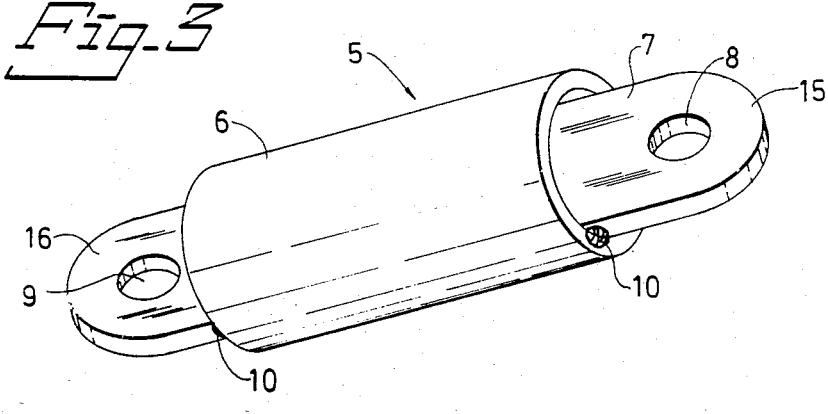

VEHICLE TRACK HAVING FLEXIBLE INTERCONNECTED LINKS

BACKGROUND OF THE INVENTION

The present invention relates to vehicle drive belts or tracks of the type intended for installation across a pair of rubber wheels of a vehicle and comprising track links which extend across the shoulders of the wheels, and more particularly to such track links having cylindrical holes in the longitudinal direction of the tracks for receiving respective longitudinal connecting units which connect the track links together.

The expression "drive track" is used herein to denote a track-like device intended to be placed across a pair of wheels of a vehicle so as to achieve an arrangement similar to caterpillers of crawling treads, but wherein the wheels are rubber wheels. Arrangements of this type have arroused increasing interest in recent years since requirements demand a lower surface pressure per unit area in many cases than can practically be achieved by means of a pair of drive wheels. Driving more than one pair of wheels (i.e., four-wheel drive) by means of a universal joint entails extra costs, as do solutions involving ordinary caterpillars. It has proved economic in this context to place some type of belt or track across two or more wheels. The simplest such version consists of a track of interconnected steel links which run across two wheels. The use of a steel track of this type involves, however, the disadvantage of comparatively large stresses on bearings, etc., since the track links are not flexible and are not sprung. Thus, all of the spring action must be absorbed by the rubber wheels and their bearings. Against this background, it has been deciced to make the track's individual track links of urethane rubber since this material has satisfactory strength properties and satisfactory resistance to abrasion, as well as satisfactory elasticity compared with, for example, steel links.

The known track links of urethane rubber have been connected by means of chain links which engage projecting lugs or teeth. The projecting lugs must be reinforced and doing so requires an amount of material which is by no means negligible. The lugs must be strong not only to transmit any tensile forces which may occur but also to withstand the major forces which arise when, for example, the center of the track links is pressed up—when crossing for example, stones and stumps—to such an extent that the track link changes or attempts to change its curvature. As can readily be understood, this also means that the link system connecting the individual track links together must be strong. The strength requirements result in comparatively large dimensions for the chian links and, above all, for the lugs or teeth on the track links, and space problems can arise in certain machines, particularly those which are small in size. In this context it should also be noted that an increase in width of the track does not, unfortunately, benefit the contact surface but merely entails a loss of space. As a result of the spatial disadvantage mentioned above and of the considerable quantity of material consumed, the competitive situation for track links made of urethane rubber has suffered, despite the superiority of this material in other respects.

The object of the present invention is to provide a drive track in which the material consumption is minimized, in which the dimensions of the connecting units have been decreased so that drives of this type can be made economically justifiable even in small applications such as, for example, the drive track for mini-loaders. The invention is not, of course, limited to small applications but can also be used to advantage for large machines.

SUMMARY OF THE INVENTION

The above-mentioned problem is solved in accordance with the invention by providing track links incorporating cylindrical holes in the edges thereof bent around the wheel, the cylindrical holes being directed in the longitudinal diection of the track. Rotatable cylindrical fastening units are inserted in these holes. In a preferred arrangement of the invention, these cylindrical fastening units comprise a tube in which an elongated member, such as a piece of strip iron with holes at each end, is arranged, so that the aforementioned holes on adjacent fastening units can be connected by means of coupling means such as U-shaped chain links or bolts. Such an arrangement also facilitates the replacement of any damaged track links since it is economically justifiable to use removable joint elements between each track link. Disks, which are in contact with the track links, may be provided for transmitting the drive force between the chain link system arranged at the side and the track links. As a result of the fact that the track link can rotate in relation to the fastening units, the track links can be permitted to become inverted without the introduction of extra stresses over and above the elasticity of the track link and without any extra forces being applied to the connecting links as a result, thus making it possible to design the connection links with smaller dimensions than was formerly the case.

BRIEF DESCRIPTION OF THE DRAWINGS

FIG. 1 shows a track link of the invention seen in the transverse direction of the track;

FIG. 2 shows the same link seen from above;

FIG. 3 shows a fastening unit or fastening link for the track link seen in detail and enlarged;

DETAILED DESCRIPTION

Figure 4:
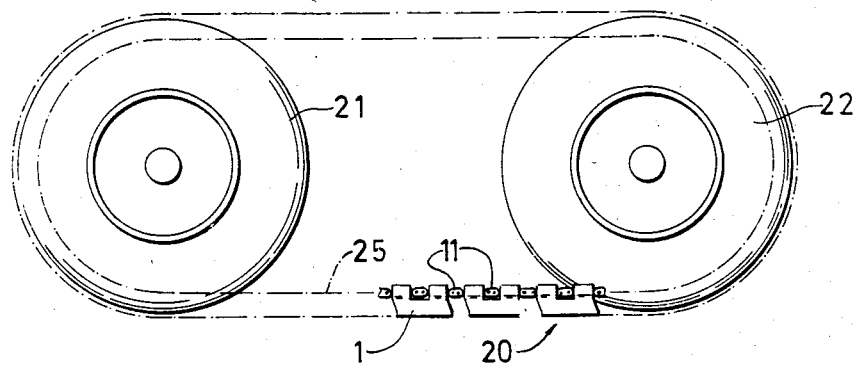
FIG. 4 is a side view of a pair of wheels around which a track of the invention has been installed.

The track links 1 of FIG. 1 are preferably made of polyurethane rubber and comprise two cylindrical holes 2,3 extending in the longitudinal direction of the track, for receiving a fastening unit in accordance with the invention (the fastening unit has been omitted in FIG. 1). One of the vehicle wheels 4 belonging to the track has been designated 4. The inverted positions for the track has also been indicated by means of broken lines in FIG. 1. This inverted position can occur mainly between the two wheels (FIG. 4) across which the track is installed but can also occur in connection with a major concentrated load and a low air pressure in one of the wheels.

FIG. 3 shows a fastening unit 5 which comprises a cylindrical tubular part 6 in which a piece of flat strip iron 7 is inserted, the strip iron 7 being provided with two holes 8,9 at the respective opposite ends 15,16 thereof. The tubular part 6 is then welded to the strip iron 7 at welding points 10. When constructing a track in accordance with the invention, fastening units 5 are inserted into holes 2,3 in the track links 1, as illustrated in FIG. 2, whereupon the fastening units 5 are connected to each other. In the illustrated design, units 5 are connected together by means of U-shaped coupling links 11 passing through the holes 8,9 at the ends of the fastening units 5 as shown in FIG. 2. The U-links 11 are then closed by pressing a yoke retaining member 12 onto their shanks. The yoke 12 is fixed in position on the U-link 11 by means of through locking studs 13 in corresponding holes in both the yoke 12 and the shank ends. Studs 13 may be press fit in their respective holes, or may be in the form of rivets, screws, or the like. A certain play for the U-link 11 in the two holes 8,9 in the fastening units 5 permits the links 11 to also move laterally, so that undesirable stresses are avoided when the track links 1 are inverted as shown in FIG. 1 to produce an increased spacing between holes 2,3.

In order to transmit tensile forces, including any drive forces, to the track links from the side chains formed by the interconnected fastening units 5 and U-shaped coupling links 11 without giving rise to any risk of uneven wear on the track links, it may be suitable, as is illustrated in FIG. 2, to arrange disks 14 which are pressed over the projecting ends 15,16 of the flat strip irons 7. One of the disks 14 of a respective fastening unit 5 can be welded in position at one end of the tubular member 6. In order to achieve considerable load-bearing capacity, each track link should have a comparatively large dimension in the longitudinal direction of the track but the track links must also be capable of following the periphery of the wheels. This has been achieved by providing recesses 17 on each opposite side of each track link 1 for receiving intermediate U-shaped links 11, the result being that the sides of the track links 1 are more flexible in the longitudinal direction of the overall track. Thus, in FIG. 2, each link 1 utilizes two fastening units, one at each end of the link, with associated U-shaped links 11.

FIG. 4 illustrates a drive track 20 assembled with fastening units 5 and links 1 of the type described with respect to FIGS. 1-3. The track in FIG. 4 is arranged around a pair of wheels 21,22 of a vehicle, the remainder of the vehicle not being illustrated.

Figure 5:
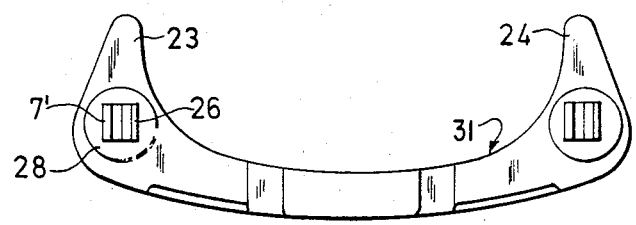
FIG. 5 shows an alternative embodiment of the track link seen in the same direction as FIG. 1.
Figure 6:
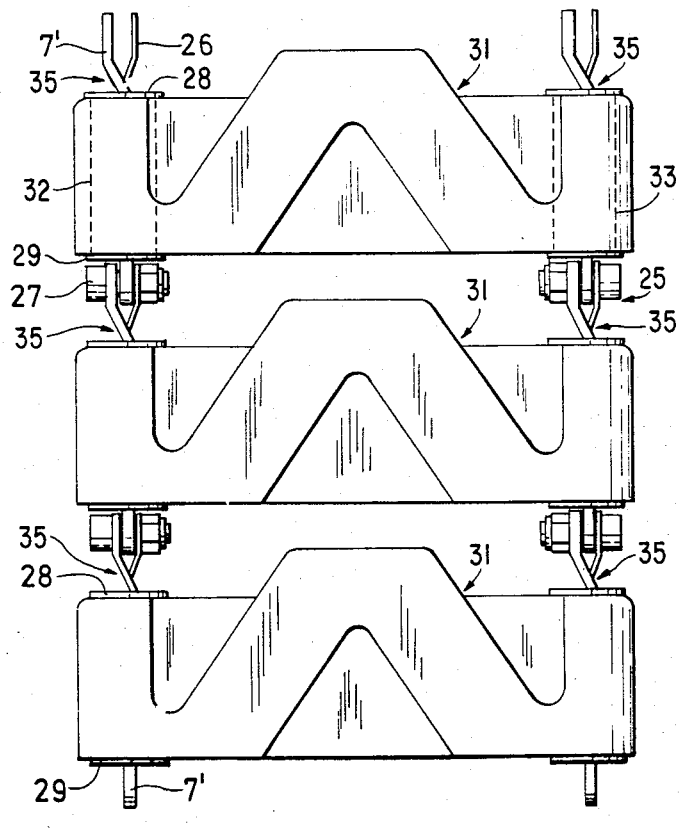
FIG. 6 shows part of a track comprising the track links of FIG. 5 joined together by means of an alternative fastening link.

FIGS. 5 and 6 illustrate an alternative embodiment of a track link 31 and fastening unit. The track links 31 are also preferably made of urethane rubber but are shorter in the longitudinal direction of the track so that only one fastening unit is required on each side of the track link, as seen in FIG. 6. Furthermore, the ends of the track links 31 have guide flanges 23, 24 (FIG. 5) which project essentially at right angles from the main plane of the track link. The holes 32,33 for the fastening units 35 are made in the base part of the flanges 23,24 as a result of which the two chains 25 (see FIG. 4) formed by the fastening units 35 are located close to the periphery of the wheels 21,22 so that the track and the wheels have essentially the same speed around the periphery of the wheels. This avoids swaying or careening and abrasion between the track and the wheels.

In the embodiment of FIGS. 5 and 6, the fastening units 35 comprise a strip iron member 7', bent at one end so as to be offset from the longitudinal axis, and at said one end of which a further shank 26 is welded so as to form a generally U-shaped coupling end in which the opposite straight end of the strip iron 7' of the next link can be inserted and connected by means of a coupling bolt 27 through holes in the ends thereof. In all other respects, the fastening unit 35 of FIGS. 5 and 6 is substantially identical with fastening unit 5 of FIGS. 1-3. Disks 28,29 are arranged on either side of the track link as in the embodiment of FIGS. 1-3. The disk 28 at the U-shaped coupling end is welded in position to the tubular part 6 (not shown in FIGS. 5 and 6) of the fastening unit 35.

The present invention provides a simple and practical connection for the various track links as well as an economic design for the track links, particularly when compared with the attachment method used heretofore for track links in which lugs or teeth on the track links have been used as inserts in special chains. The extremely large bearing or attachment surface between a track link 1,31 and fastening units 5,35, which distributes the force over a large area and entails very little wear, is also important. Since the track links are preferably made of polyurethane rubber, which is an excellent bearing material, no bushings or reinforcements are required.

By virtue of the U-shaped links 11 and/or the connecting bolts 27, replacement of any damaged track links is facilitated since the connecting members are easily removable and the track link easily replaced.

It should be noted that in operation, it is the track links 1,31 which, when necessary, turn in relation to the fastening units 5,35 which fastening units move in what is essentially a fixed track, since the fastening units 5,35 can only rotate around shafts parallel to the wheel axles, thus also providing the track of the present invention with the added advantage of good lateral rigidity.

In accordance with the construction of the invention described above, instead of attempting to get the track link to resist deformation in the well known manner, for example concentrated central compressive loads, the arrangement in accordance with the invention permits the track link to yield to the external forces and even to change its curvature. The track link admittedly exerts lateral forces in conjunction with this but these lateral forces do not have any essential significance due to the elasticity of the track link and to the installation of the track across rubber wheels.

Compared with, in particular, conventional and almost unyielding steel linked tracks, the present invention results in a more uniform distribution of pressure against the base (i.e., ground) even if the base is uneven. This effect is a result of the fact that the construction of the present invention improves the mobility of the track links. The improvement in mobility results, in turn, in a reduction in the bearing stresses applied to the wheel axles of the vehicles, an advantage which can be of particular importance in cases when the track is used across undriven idler wheels. There is no risk of the track becoming unnecessarily slack between the wheels since the necessary spring action is provided by each individual track link and not by the assmebled link system as a whole.

I claim:

1. A vehicle track for installation across a pair of rubber wheels, comprising:
   a plurality of flexible track links (1,31) which extend laterally over the shoulders of the wheels, the track links (1,31) at the respective sides of the track having cylindrical holes (2,3; 32,33) which extend in the longitudinal direction of the track;

two longitudinally extending chain-like connecting units (25) in the respective holes on opposite sides of the track links for holding said track links together to form a track;

each chain-like connecting unit (25) including a plurality of fastening units (5, 35) rotatably journalled in said cylindrical holes (2,3; 32,33) of said track links; and a plurality of coupling means (11,27) coupling adjacent fastening units together such that said fastening units can rotate in said holes when said flexible links change form due to flexing thereof in use;

said fastening units (5,35) each including a cylindrical central portion (6) and lug portions (15,16) which project axially from opposite ends of said cylindrical central portion; and said coupling means (11,27) engaging said lug portions (15,16) of adjacent fastening units (5,35) to connect said adjacent fastening units together.

2. The vehicle track of claim 1, wherein said fastening units (5,35) each include a pair of disks (14; 28, 29) at the ends of said cylindrical central portions for transferring longitudinal forces between said track links and said fastening units.

3. The vehicle track of claim 2, wherein said cylindrical central portion (6) comprises tubular member; and said fastening units each further include an elongated member (7) extending through said tubular member and fastened to said tubular member; said lug portions (15,16) comprise end portions of said elongated member (7) which extend out of opposite ends of said tubular member.

4. The vehicle track of claim 2, wherein one of said disks (14; 28) is rigidly attached to an end of said cylindrical central portion.

5. The vehicle track of claim 2, wherein said coupling means comprises a plurality of generally U-shaped links (11), which are inserted in holes provided in the lugs (15,16) of respective adjacent fastening units.

6. The vehicle track of claim 5, wherein said coupling means further comprises a retaining member (12) coupled to the free ends of said U-shaped links (11) for retaining said U-shaped links in their respective holes.

7. The vehicle track of claim 2, wherein said coupling means comprises a plurality of generally elongated bolt-like members (27) which are inserted in holes provided in the lugs of respective adjacent fastening units.

8. The vehicle track of claim 7, wherein said lug portions at each end of said cylindrical central portion comprises a generally U-shaped lug portion.

9. The vehicle track of claim 1, wherein said cylindrical central portion (6) comprises a tubular member; and said fastening units each further include an elongated member (7) extending through said tubular member and fastened to said tubular member; said lug portions (15,16) comprise end portions of said elongated member (7) which extend out of opposite ends of said tubular member.

10. The vehicle track of claim 1, wherein said fastening units are directly journalled in the respective holes of said track links.

11. The vehicle track of claim 5, wherein said track links are made of polyurethane rubber.

12. The vehicle track of claim 1, wherein said track links are made of polyurethane rubber.

13. The vehicle track of claim 1, wherein said coupling means comprises a plurality of generally U-shaped links (11), which are inserted in holes provided in the lugs (15,16) of respective adjacent fastening units.

14. The vehicle track of claim 13, wherein said coupling means further comprises a retaining member (12) coupled to the free ends of said U-shaped links (11) for retaining said U-shaped links in their respective holes.

15. The vehicle track of claim 1, wherein at least one of the sides of the respective track links has a recess (17) for receiving an intermediate coupling means (11,27), said at least one side of said track links having two of said cylindrical holes in longitudinal alignment, a fastening unit (5,35) being rotatably journalled in each of said aligned holes, said intermediate coupling means coupling said fastening units in said two aligned holes together.

16. The vehicle track of claim 1, wherein the ends of the track links comprises guide flanges (23,24) projecting essentially at right angles from the main plane of the respective track links.

17. The vehicle track of claim 16, wherein said holes for receiving said fastening units (5,35) are provided in the base part of said flanges (23,24).

18. The vehicle track of claim 1, wherein said coupling means (11,12) pivotally couples adjacent fastening units together for pivotal movement about an axis substantially parallel to the axle of the vehicle wheel.

19. The vehicle track of claim 1, wherein said coupling means comprises a plurality of generally elongated bolt-like members (27) which are inserted in holes provided in the lugs of respective adjacent fastening units.

20. The vehicle track of claim 19, wherein said lug portions at each end of said cylindrical central portion comprises a generally U-shaped lug portion.

* * * * *